United States Patent

Kilkki et al.

[19]

[11] Patent Number: 6,011,778
[45] Date of Patent: Jan. 4, 2000

[54] TIMER-BASED TRAFFIC MEASUREMENT SYSTEM AND METHOD FOR NOMINAL BIT RATE (NBR) SERVICE

[75] Inventors: Matti Kalevi Kilkki, Espoo; Jussi Pekka Olavi Ruutu, Helsinki; Sari Irene Saranka, Espoo, all of Finland

[73] Assignee: Nokia Telecommunications, Oy, Espoo, Finland

[21] Appl. No.: 08/821,362

[22] Filed: Mar. 20, 1997

[51] Int. Cl.⁷ ........................................... G01R 31/08
[52] U.S. Cl. ................................. 370/232; 370/468
[58] Field of Search .................... 370/230, 232, 370/233, 234, 253, 412, 468, 395, 397

[56] References Cited

U.S. PATENT DOCUMENTS

| | | | |
|---|---|---|---|
| 4,953,157 | 8/1990 | Franklin et al. | 370/230 |
| 5,042,029 | 8/1991 | Hayakawa | 370/60 |
| 5,193,151 | 3/1993 | Jain | 370/230 |
| 5,295,135 | 3/1994 | Kammerl | 370/233 |
| 5,359,593 | 10/1994 | Derby et al. | 370/234 |
| 5,546,389 | 8/1996 | Wippenbeck et al. | 370/60 |
| 5,587,997 | 12/1996 | Jacobson | 370/253 |
| 5,633,859 | 5/1997 | Jain et al. | 370/234 |

OTHER PUBLICATIONS

Technical Committee, Traffic Management Specification Version 4.0, af–tm–00561.000, Apr. 1996, pp. 1–59.

Integrated Services Digital Network (ISDN) Overall Network Aspects and Functions, Traffic Control and Congestion Control in B–ISDN, ITU–T Recommendation 1.371, Mar. 1993, pp. 1–27.

What are the meaning of CBR, VBR, ABR, UBR?, Maintained by Carl Symborski, Last Changed Aug. 20, 1996, pp. 1–2 and 1–5.

ATM Service Categories: The Benefits to the User, Editor: Libio Lambaarelli, CSELT' Torino, Italy, pp. 1–10.

An Overview of ATM Technology, Gary Kessler, Jan. 1995, pp. 1–10.

ATM—The New Technology for Tomorrow's B–ISDN, Engui Yao, Dec. 1994, pp. 1–23.

*Primary Examiner*—Hassan Kizou
*Assistant Examiner*—Daniel Previl
*Attorney, Agent, or Firm*—Altera Law Group, LLC

[57] ABSTRACT

A system and method for controlling cell transmission from a network source unit to network destination units across a network connection is provided. A timer is initiated upon transmission of a cell from the network source unit. A timer output value, provided at the timer output, is adjusted to reflect a time lapse measured from the time of initiation of the timer. The timer output value is compared to an expected cell time interval upon transmission of a subsequent cell, to establish a rate variation indicator. The rate variation indicator generally indicates whether the cell transmission rate is increasing or decreasing at a particular time. A cell priority value, derived from the rate variation indicator, is loaded into the subsequent cell for use by the network connection.

20 Claims, 10 Drawing Sheets

TIMER-BASED TRAFFIC MEASUREMENT SYSTEM AND METHOD FOR NOMINAL BIT RATE (NBR) SERVICE

FIELD OF THE INVENTION

The present invention relates generally to communications systems, and more particularly, to a timer-based system and method for measuring cell transmission rates and assigning cell priorities to cells sent through a network employing a nominal bit rate (NBR) service.

BACKGROUND OF THE INVENTION

The state of communications technology, particularly that which affects the Internet, is currently in flux and subject to rapid and often uncoordinated growth. The ubiquity and variety of personal computers and set-top boxes has placed significant pressure on the providers of communications system infrastructure to accommodate the alarming increase in the number of new users that demand immediate access to Internet and other network resources. The rapid development of new and sophisticated software made available to users of such services places additional demands on system infrastructure.

Conducting commerce over the Internet and other networks is a practice that is gaining acceptance and popularity. By way of example, traditional on-line services, such as those offered by Internet providers, typical charge customers a monthly fee for access to basic services and resources, such as proprietary and public databases of information. Such traditional service providers also advertise any number of products or services which are purchasable on-line by the user.

Other forms of Internet commercialization currently being considered or implemented include offering of video and audio conferencing services, and a variety of other real-time and non-real-time services. The providers of these services, as well as the providers of communications system infrastructure, are currently facing a number of complex issues, including management of network capacity, load, and traffic to support real-time, non-real-time, and high-bandwidth services, and implementing a viable billing scheme that accounts for the use of such services.

The communications industry is expending considerable attention and investment on one particular technology, referred to as asynchronous transfer mode (ATM), as a possible solution to current and anticipated infrastructure limitations. Those skilled in the art understand ATM to constitute a communications networking concept that, in theory, addresses many of the aforementioned concerns, such as by providing a capability to manage increases in network load, supporting both real-time and non-real-time applications, and offering, in certain circumstances, a guaranteed level of service quality.

A conventional ATM service architecture typically provides a number of predefined quality of service classes, often referred to as service categories. Each of the service categories includes a number of quality of service (QoS) parameters which define the nature of the respective service category. In other words, a specified service category provides performance to an ATM virtual connection (VCC or VPC) in a manner specified by a subset of the ATM performance parameters. The service categories defined in the ATM Forum specification referenced hereinbelow include, for example, a constant bit rate (CBR) category, a real-time variable bit rate (rt-VBR) category, a non-real-time variable bit rate (nrt-VBR) category, an unspecified bit rate (UBR) category, and an available bit rate (ABR) category.

The constant bit rate service class is intended to support real-time applications that require a fixed quantity of bandwidth during the existence of the connection. A particular quality of service is negotiated to provide the CBR service, where the QoS parameters include characterization of the peak cell rate (PCR), the cell loss rate (CLR), the cell transfer delay (CTD), and the cell delay variation (CDV). Conventional ATM traffic management schemes guarantee that the user-contracted QoS is maintained in order to support, for example, real-time applications, such as circuit emulation and voice/video applications, which require tightly constrained delay variations.

The non-real-time VBR service class is intended to support non-real-time applications, where the resulting network traffic can be characterized as having frequent data bursts. Similarly, the real-time variable bit rate service category may be used to support "bursty" network traffic conditions. The rt-VBR service category differs from the nrt-VBR service category in that the former is intended to support real-time applications, such as voice and video applications. Both the real-time and non-real-time VBR service categories are characterized in terms of a peak cell rate (PCR), a sustainable cell rate (SCR), and a maximum burst size (MBS).

The unspecified bit rate (UBR) service category is often regarded as a "best effort service," in that it does not specify traffic-related service guarantees. As such, the UBR service category is intended to support non-real-time applications, including traditional computer communications applications such as file transfers and e-mail.

The available bit rate (ABR) service category provides for the allocation of available bandwidth to users by controlling the rate of traffic through use of a feedback mechanism. The feedback mechanism permits cell transmission rates to be varied in an effort to control or avoid traffic congestion, and to more effectively utilize available bandwidth. A resource management (RM) cell precedes the transmission of data cells, which is transmitted from source to destination and back to the source, in order to provide traffic information to the source.

Although the current ATM service architecture described above would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation I.371, entitled Traffic Control and Congestion Control in B-ISDN, and in Traffic Management Specification, version 4.0 (af-tm-0056.000, April 1996), published by the Technical Committee of the ATM Forum.

One traffic parameter utilized in conventional traffic management schemes includes the rate at which cells are transmitted by the user. Conventional ATM traffic management principles provide for cell transmission rate adjustments based on feedback control information received from the network. This additional complexity may be undesirable, as it may be faster and more efficient to perform these operations at the user/network interface (UNI). Furthermore, these conventional measurement principles provide feedback information periodically rather than continually providing cell rate information at the UNI. The conventional traffic management schemes also fail to provide measurement techniques for a succession of multiple cell priority values as is utilized in connection with the nominal bit rate service.

Accordingly, there is a need in the communications industry for a network arrangement and method that provides for a traffic management system and method which is conceptually uncomplicated to implement. A further need exists for a system and methodology that provides a timer-based cell traffic measurement principle at the UNI, to allow cell rate information to be continuously available to the user, rather than only providing information periodically, and which further avoids the complexity of cell feedback techniques. A system and methodology for assigning multiple priority levels, rather than a general on/off priority designation, is also desirable for use in connection with a nominal bit rate service as described herein. The present invention fulfills these and other needs, and offers other advantages over the prior art traffic management approaches.

SUMMARY OF THE INVENTION

The present invention is directed to a system and method for controlling the priority assigned to information elements transmitted across a network connection. A timing scheme is employed to measure the transmission rate of information elements, such as cells, and to assign one of a sequential collection of cell priorities to cells transmitted from a cell source. The cells, each loaded with one of the cell priorities, are transmitted via a network connection having a quality of service based on a nominal bit rate (NBR). A nominal bit rate represents an expected, but not guaranteed, bit rate associated with a particular user or connection, and utilizes multiple cell priorities in managing cell traffic. The present invention provides a timer-based system and method to support the cell traffic management in such a system.

In accordance with one embodiment of the invention, a method for controlling cell transmission from a network source unit to network destination units across a network connection is provided. A timer is initiated upon transmission of a cell from the network source unit. A timer output value, provided at the timer output, is adjusted to reflect a time lapse measured from the time of initiation of the timer. The timer output value is compared to an expected cell time interval upon transmission of a subsequent cell, to establish a rate variation indicator. The rate variation indicator generally indicates whether the cell transmission rate is increasing or decreasing at a particular time. A cell priority value, derived from the rate variation indicator, is the loaded into the subsequent cell.

In accordance with another embodiment of the invention, the timer is preloaded with a the expected cell time interval, and the timer output value is periodically decremented at known time intervals. The timer output value available at the timer output upon the occurrence of the next cell transmission then corresponds to the difference between the expected cell time interval and the time interval between the most recent cell transmissions. A positive or negative difference indicates whether the expected time interval is a longer or shorter duration respectively than the interval between the most recent cell transmissions. The magnitude of this difference is used to appropriately increase or decrease the priority level assigned to cells.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which.

DETAILED DESCRIPTION OF THE ILLUSTRATED EMBODIMENTS

Figure 1:
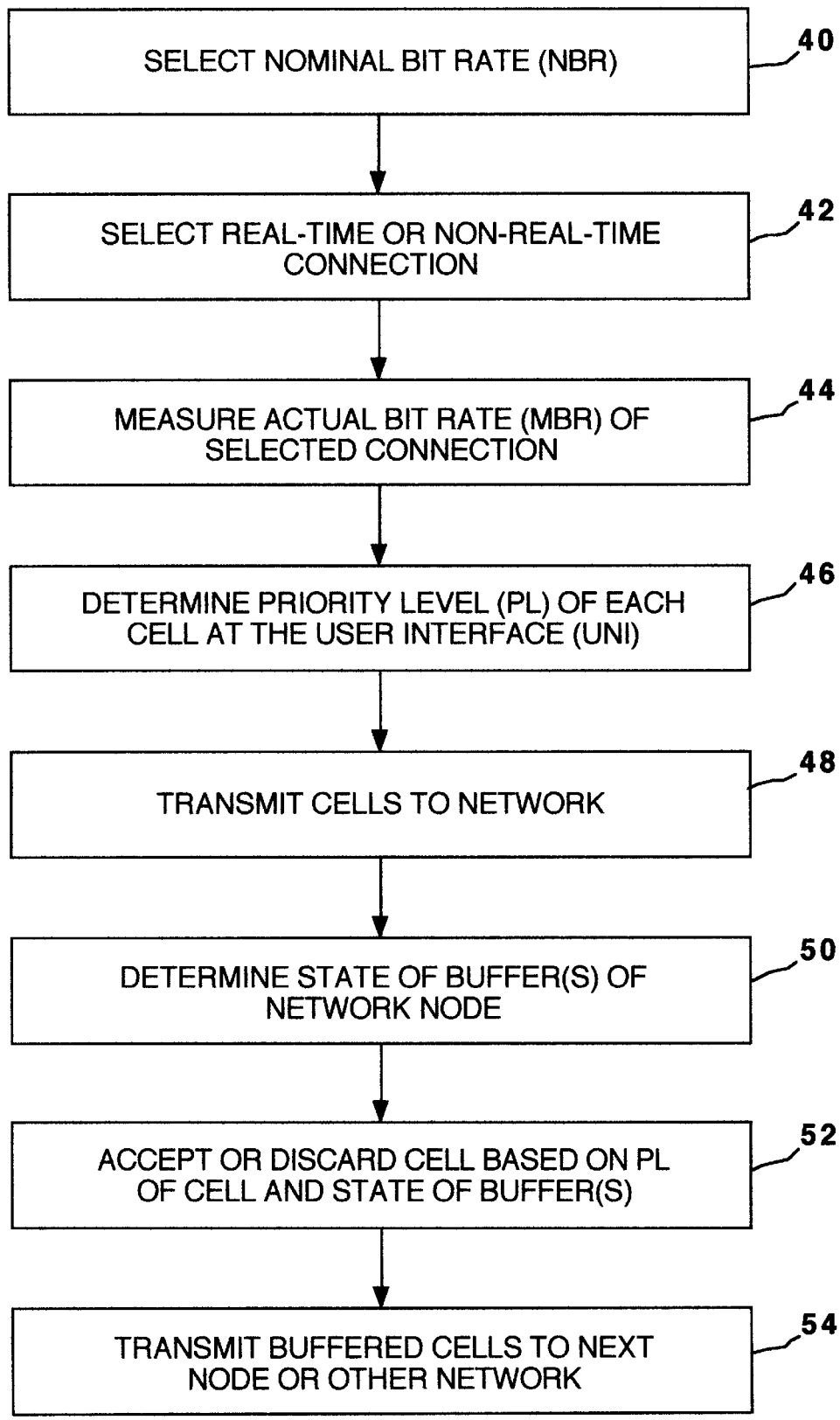
FIG. 1 is a flow diagram illustrating a general procedure for communicating cells of information between a user/network interface and a network using a nominal bit rate service in accordance with an embodiment of the present invention.

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The service concept described herein may be viewed as a Simple Integrated Media Access (SIMA) service model. The SIMA service model incorporates the basic properties of ATM with the addition of eight priority levels as defined within the context of a new service concept termed a nominal bit rate (NBR) service. In general, the NBR service provides for the simple and efficient division of network capacity amongst different connections and the charging of user fees for the use of such connections. A network that embraces a basic version of the SIMA service model does not need to perform many of the traditional and burdensome traffic management functions involving traffic descriptors, quality of service parameters, service classes, connection admission control (CAC), or usage parameter control (UPC).

All of these functions are effectively replaced by functions performed by two autonomous units: a measuring unit, provided at a user/network interface, and a cell scheduling and buffering unit, provided at a network node. The SIMA service concept, from a user's perspective, is simple and understandable, because there are no pre-defined traffic or quality parameters associated with each connection, and charging for connection usage is based solely on the value of NBR and the duration of the connection.

A typical implementation of a SIMA service utilizes two primary components: access nodes and core network nodes, which have fundamentally different functional responsibilities. For example, access nodes, which may be a user/network interface, perform the task of measuring traffic for every connection, whereas at the core network nodes, the traffic control functions do not need to know anything about the properties of individual connections.

The elegant simplicity of the SIMA service model offers obvious advantages to the manufacturers of infrastructure hardware and software. For example, ATM switches or crossconnects can be built using individual cell scheduling and buffering units, switching fabrics, and routing functions. By using ATM virtual paths or IP switching technology, the routing tasks may be reduced in complexity. In addition, packet discarding and priority feedback features may be included in the cell scheduling and buffering units without negatively impacting their automaticity. Also, simple implementation of network nodes may result in the availability of a relatively inexpensive, high capacity network infrastructure.

The more complex unit of the SIMA service infrastructure concerns the access nodes. Such access nodes will typically include a measuring unit to measure the traffic stream of every connection in real-time, and a computation unit for determining a priority to be assigned to every cell. These additional features should be implementable at a level of difficulty no greater than that for effecting UPC in conventional ATM networks.

The present invention provides a system and methodology for measuring the cell transmission rate from the user/network interface (UNI), and for assigning one of a succession of priority levels to each of the cells output from the UNI. The system utilizes a timer-based measuring concept, where a timing technique is used to determine the difference between an expected cell arrival and an actual cell arrival. The difference is extrapolated onto a known response function from which the priority level can be calculated. The priority level is assigned to cells subsequently output from the cell output source. The expected time interval is continually updated to reflect the time interval between previously transmitted cells.

Referring now to FIG. 1, there is shown a general methodology for transmitting information between a user/network interface (UNI) and a network over an NBR service connection. Initially, a user negotiates or selects 40 a nominal bit rate with the network operator, which may be performed prior to, or at the time of, establishing the connection. In one embodiment, the user informs the network operator that a desired NBR is required, and the requested connection bandwidth is allocated to the user. The network operator, in accordance with this embodiment, need not perform the task of analyzing current network load conditions existing at the core network nodes prior to establishing or releasing an NBR connection. In an alternative embodiment, the network operator performs the task of determining network load status prior to establishing or releasing an NBR connection, although this task may not be necessary in a properly dimensioned network supporting an NBR service.

Depending on a particular application, the user selects 42 a real-time or a non-real-time network connection. The process of determining the priority level (PL) of each cell, which indicates the importance or criticality of the cell relative to other cells, involves measuring 44 the actual or measured bit rate (MBR) of the selected real-time or non-real-time connection at the UNI. The priority level of each cell is determined 46 at the UNI. In one embodiment of the invention, a ratio of the MBR and the NBR is used to determine 46 the priority level (PL).

After computing the priority level of each cell at the UNI, the cells are transmitted 48 to the network, such as to a node of the network. A network node, upon arrival of a cell transmitted from the UNI, performs a cell filtering process by which the node determines whether to accept or discard a particular cell. The cell filtering process involves determining 50 the state of one or more buffers or memories of the network node to determine a buffer or memory occupancy level. The node accepts or discards 52 a cell based on the priority level of the cell and the state of the node buffer. Cells that meet the filtering criteria determined at the node are accepted, buffered, and eventually transmitted 54 to another node in the network or another network in a manner consistent with the expected quality of service for the connection.

Figure 2:
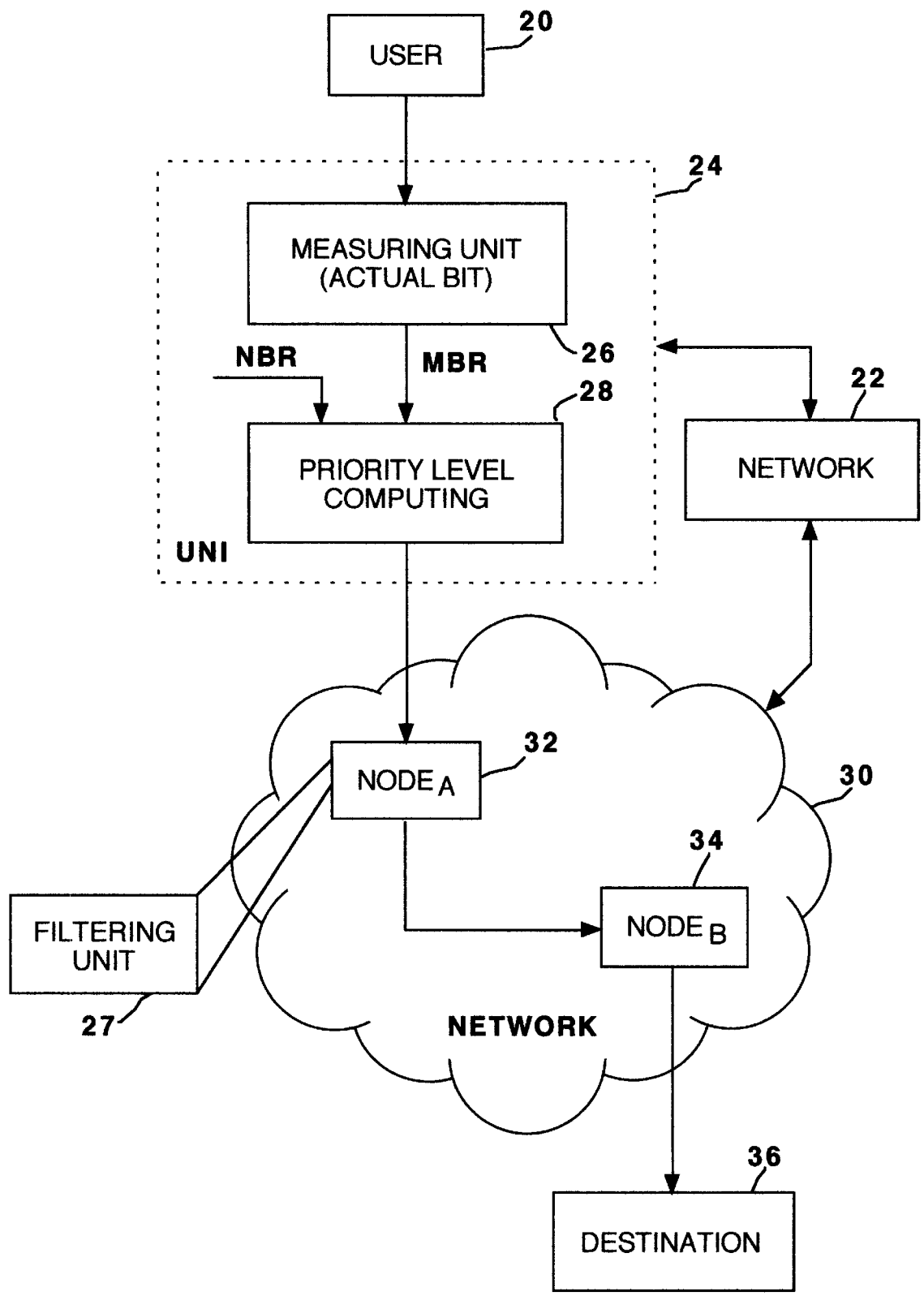
FIG. 2 is a system block diagram of a nominal bit rate service architecture in accordance with an embodiment of the present invention.

Concerning the embodiment illustrated in block diagram form in FIG. 2, there is shown a user 20 that employs a UNI 24 to communicate with a network 30. The user 20 negotiates a nominal bit rate with the network operator 22. The network operator 22 evaluates the user's NBR request based on a number of factors, including the NBR negotiated with other users 20, the number and nature of different connections associated with other users of the network, and other factors affecting network capacity and traffic flow. In principle, NBR can be zero, in which case all cells communicated through the UNI 24 are given lowest priority within the network 30. The value of NBR may also be greater than the transmission capacity at the UNI 24. If the value of NBR is significantly greater than the transmission capacity, for example, all cells transmitted from the UNI 24 are given highest priority within the network 30. It is noted that the priority level of a cell as defined herein has meaning within a network or a number of networks that embraces the NBR service concept. Cells that traverse beyond a network that offers an NBR service, such as by use of an network/network interface (NNI), may be processed in accordance with the traffic management strategy employed by such other network.

In contrast to conventional network services which are designed to provide a guaranteed quality of service, the network operator 22 does not guarantee the continuous availability of the user negotiated NBR. A properly dimensioned network, however, should provide adequate bandwidth to virtually ensure, although not guarantee, the availability of an established NBR. It is noted that all users who are transmitting data with an equivalent NBR encounter approximately the same quality of service.

Having established an NBR with the network operator 22, the user 20 is permitted to communicate information to a desired destination 36 via the network 30. A measuring unit 26 measures the actual or instantaneous bit rate (i.e., MBR) of each cell communicated between the UNI 24 and the network 30. Prior to departure of a cell from the UNI 24, a priority level computing unit 28 determines a priority level for the cell using the negotiated NBR and the MBR. In accordance with one embodiment, one of eight priority levels may be attributed to a given cell. The priority level computing unit 28 determines the priority level of a particular cell by computing a ratio of MBR to NBR. The priority level determined by the computing unit 28 is assigned to the cell which is then transmitted from the UNI 24 to the network 30.

The UNI 24 transmits the cell, which contains priority level information, to a node of the network 30, such as $node_A$ 32. The $node_A$ 32 accepts or discards the cell received from the UNI 24 based on the priority level of the cell and the buffering capacity of $node_A$ 32. In general, as the occupancy of the buffer or memory of $node_A$ 32 increases (i.e., becomes more filled), cells having a lower priority (i.e., higher priority level value) are discarded in favor of accepting cells having a higher priority (i.e., lower priority level value). As the occupancy level of the buffer of $node_A$ 32 decreases (i.e., becomes less filled), the $node_A$ 32 becomes increasingly tolerant toward accepting cells of lower priority (i.e., higher priority level values). Cells that are buffered in $node_A$ 32 are subsequently transmitted to another node in the network 30, such as $node_B$ 34, or other network and, ultimately, to an end-destination 36.

The exemplary network 30 used for purposes of this description is depicted as a network having two intermediary nodes 32 and 34. These nodes represent network data communications elements such as routers, switches and multiplexers. However, as will be appreciated by those skilled in the art, the present invention may likewise be implemented in various multi-node network structures such as multipoint, star, ring, loop and mesh network topologies used in networks ranging from local area networks (LAN) to proliferative global area networks (GAN) such as the Internet.

Figure 3:
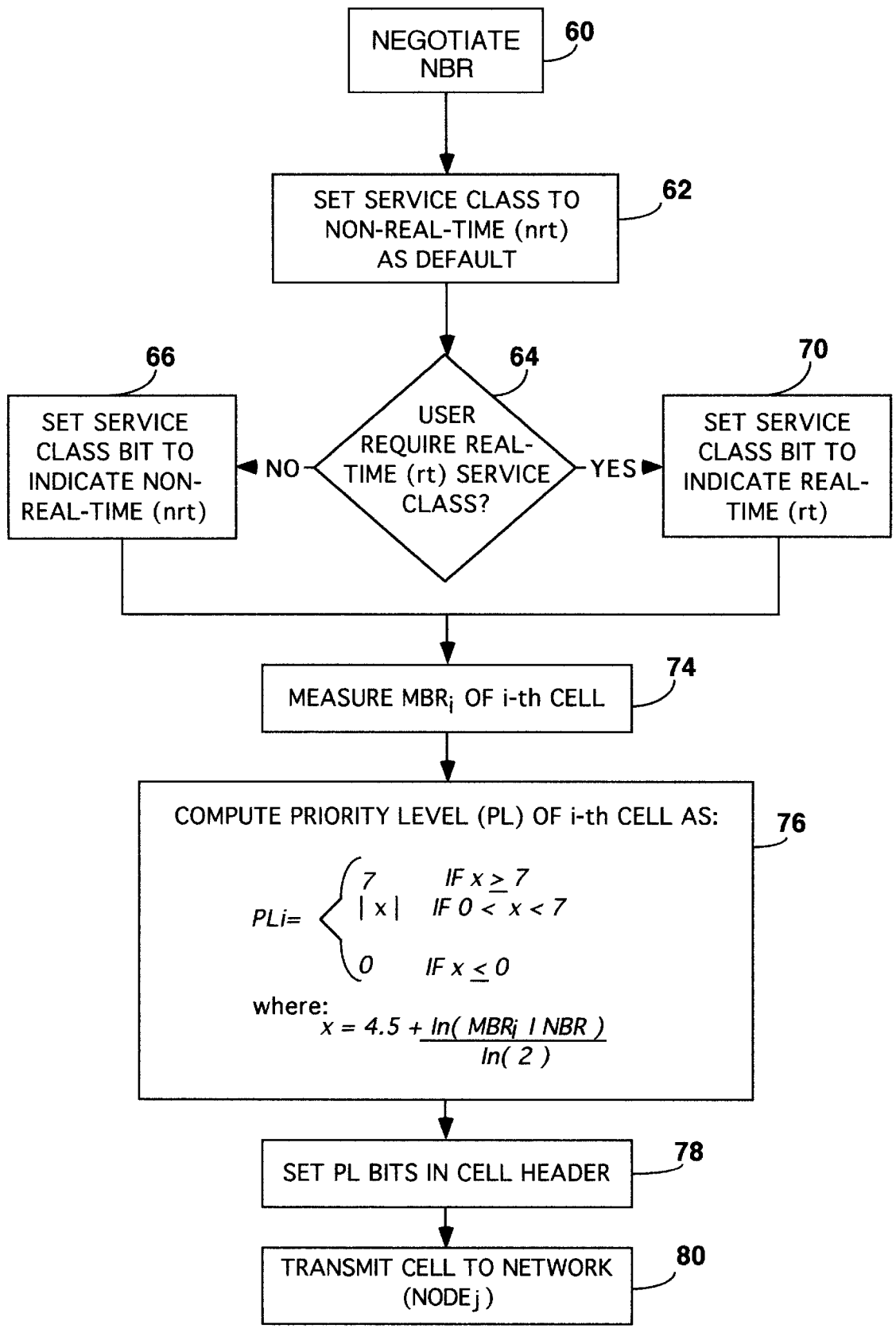
FIG. 3 illustrates in greater detail a procedure for transmitting cells of information between a user/network interface and a network using a nominal bit rate service in accordance with another embodiment of the present invention.
Figure 4:
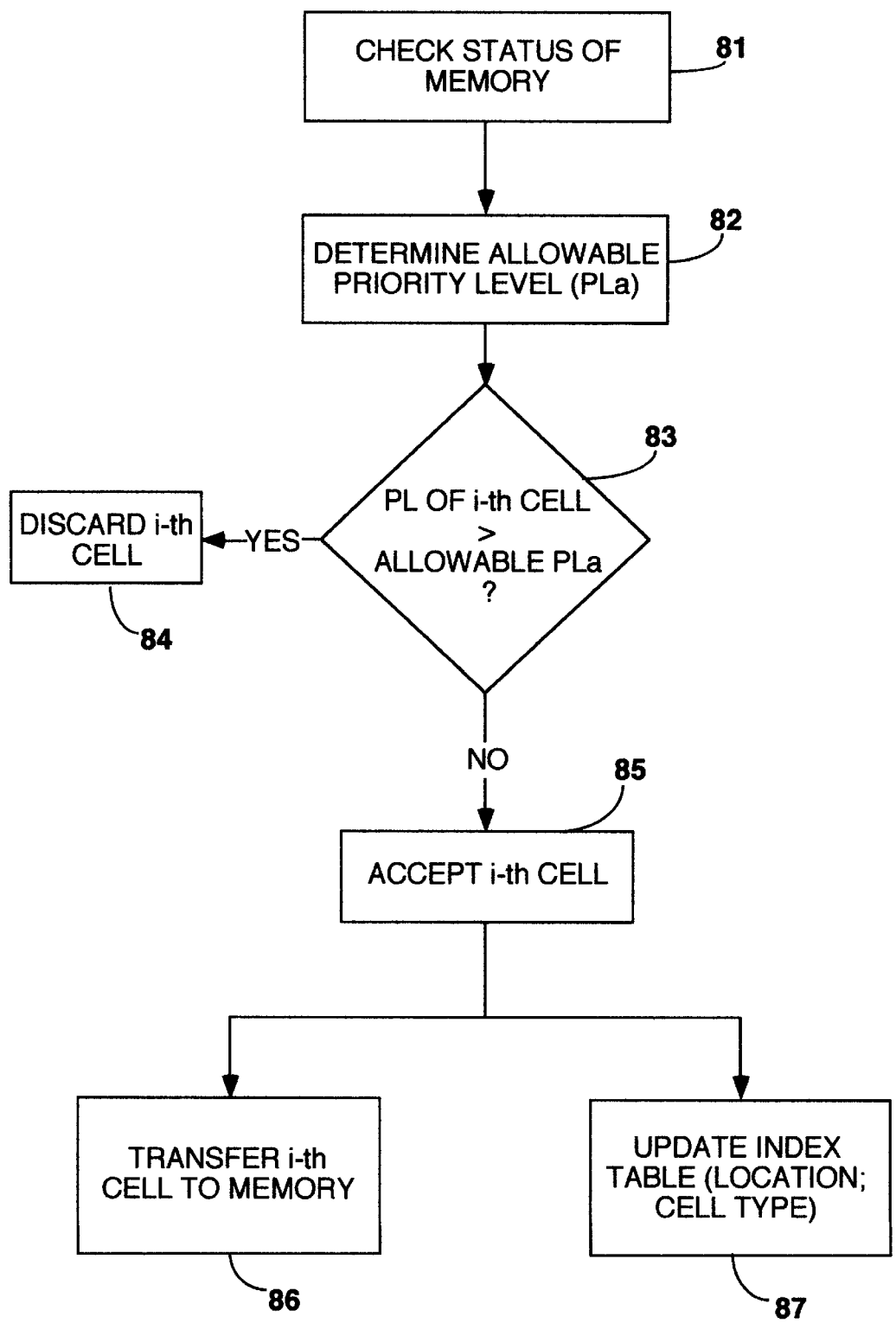
FIG. 4 illustrates in flow diagram form a general procedure for filtering cells at a network node in accordance with an embodiment of a nominal bit rate service.
Figure 5:
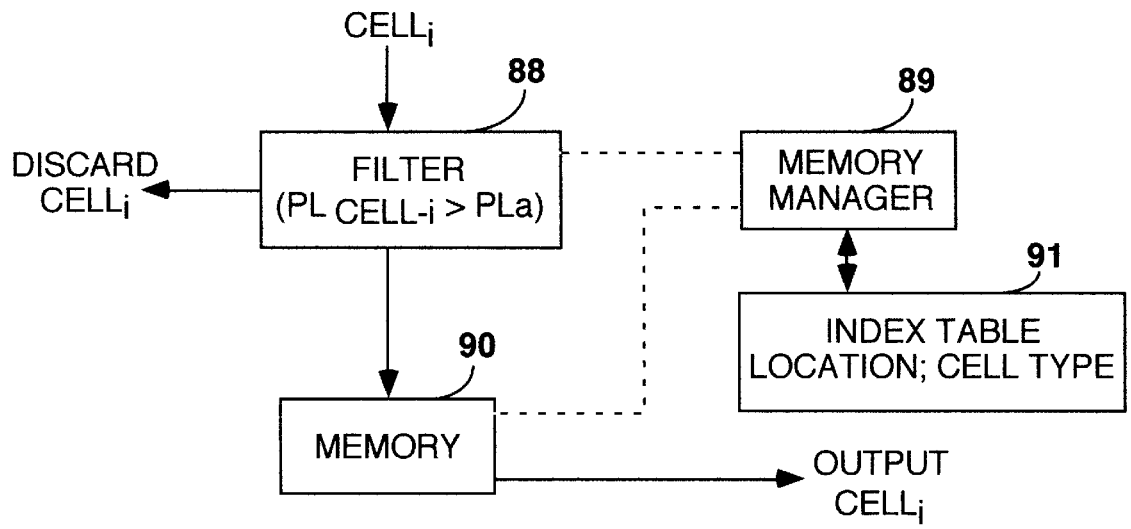
FIG. 5 is a block diagram of an embodiment of a system for filtering cells at a network node in accordance a nominal bit rate service.

FIGS. 3–5 illustrate a procedure for scheduling and buffering cells in accordance with one embodiment of an NBR service methodology. Referring now to FIG. 3, a user establishes 60 an NBR with a network operator. It may be desirable, although not required, to initially set the service class 62 to a non-real-time (nrt) service class as a default setting. Depending on a particular application, the user may require a real-time (rt) service class 64, which may be set by the user directly or, typically, by the user's application or communications software. If the user requires a real-time connection, each cell transmitted from the user's UNI will have the service class bit in the cell header set to indicate that the payload of the cell contains real-time information 70. It is noted that within the context of a network implemented in accordance with the NBR concept of the present invention, real-time service class connections are expected to support virtually any real-time application without the need to specify particular cell transfer delay (CTD) and cell delay variation (CDV) parameters. As such, the conventional procedure of setting CTD and CDV bits of the cell header to appropriate values to accommodate the real-time service requirements of the connection is altogether obviated.

If the user does not require a real-time service connection, the default non-real-time service class condition remains operative. As such, the rt/nrt service class bit of each cell header is set to indicate that the payload of the cell includes non-real-time information 66. It is noted that the NBR service disclosed herein does not utilize the cell loss priority (CLP) scheme used by conventional ATM traffic management approaches. As such, the CLP bit in the cell header may instead be used to discern between real-time and non-real-time payloads.

In the above described embodiment, each cell transmitted over a connection is designated as either a real-time cell or a non-real-time cell, such as by appropriately setting the rt/nrt service class bit of the cell header. In an alternative embodiment, depending on a user's requirements, a connection may be designated as being either a real-time or non-real-time connection, and the cells communicated over such a connection need not be individually assigned a real-time or non-real-time status. Each node for a given connection, for example, may perform a table look up procedure upon arrival of a cell at the node to determine whether the cell is associated with a real-time or a non-real-time connection. Thus, in accordance with this embodiment, a cell header bit need not be reserved for distinguishing between real-time and non-real-time cells.

After the rt/nrt service class header bit has been set in the above-described manner, the actual bit rate of a particular cell to be transmitted between the UNI and the network is measured 74. Since, in practice, the actual bit rate may be subject to significant variability over time, a measuring unit of the UNI employs an averaging measuring principle to determine the actual or instantaneous bit rate, $MBR_i$.

In general, the UNI measures 74 the actual bit rate of a cell, such as $cell_i$, by approximating the actual or instantaneous bit rate of the connection within a measuring period having a duration that is appropriate for the particular connection (e.g., a real-time or non-real-time connection). The present invention provides for the measurement of the instantaneous bit rate, $MBR_i$, as well as provides for assignment of priority values to subsequently issued cells.

Having determined 74 the measured bit rate, $MBR_i$, of the i:th cell, the priority level of the i:th cell is computed using the measured bit rate, $MBR_i$, and the nominal bit rate, NBR. In accordance with one embodiment, it is assumed that a cell may be distinguished from other cells using a cell prioritization scheme that employs eight priority levels. In order to indicate which of the eight priority levels is attributed to a particular cell, each cell allocates three bits for this purpose.

In accordance with current ATM specifications, an ATM cell is specified as a unit of transmission having a fixed-size frame consisting of a 5-octet header and a 48-octet payload. It is appreciated that the necessity to allocate three bits in the cell header for the purpose of designating cell priority level may require utilization of currently defined ATM header bits. By way of example, it may be possible to utilize the current Generic Flow Control (GFC) field which constitutes a total of four bits. In this case, three bits may be allocated for designating cell priority level and one bit may be designated as the rt/nrt service class bit. It may be possible, in accordance with another embodiment, to allocate other header bits for the purpose of indicating one of eight priority levels and rt/nrt service class by deviating from the five-octet header ATM specification.

As such, other header bits may be redefined to represent cell priority level and service class designations. Alternatively, one or more bits required to specify cell priority level and/or service class may be situated outside of the currently defined ATM cell header. The need to make a minor modification to the existing ATM cell header definition is significantly offset by the substantial advantages offered by employing the NBR service scheme of the present invention, such as a significant reduction in network and traffic management overhead and complexity.

It is understood that the number of priority levels may be less than eight or greater than eight. By way of example, if it is assumed that four cell header bits are allocated for purposes of indicating a cell's priority level, as many as $2^4$ (i.e., $2^{n\text{-}bits}$) or 16 priority levels may be defined. Increasing the number of priority levels within the context of an NBR service permits the network operator to make finer adjustments to the bandwidth of a particular connection when managing network traffic. The price for this finer level of traffic control is the additional cell header bit or bits needed to resolve a greater number of priority levels.

A priority level computing unit determines 76 the priority level of each cell, such as cell$_i$, using the computed value of MBR$_i$ and the value of NBR. In accordance with one embodiment of the present invention, and assuming that the measured bit rate is MBR$_i$ when the i:th cell is transmitted to the network, the priority level (PL$_i$) of cell$_i$ may be calculated using the following equation:

$$x = 4.5 + \frac{\ln(MBR_i / NBR)}{\ln(2)} \quad [1]$$

$$PL_i = \begin{cases} 7 & \text{if } x \geq 7 \\ \lfloor x \rfloor & \text{if } 0 < x < 7, \\ 0 & \text{if } x \leq 0 \end{cases}$$

where, $\lfloor x \rfloor$ represents the integer part of x. As will be discussed hereinbelow in accordance with an embodiment in which both NBR and traditional ATM service connections are accommodated, the zero priority level, PL=0, is reserved for those connections that use an ordinary ATM service with guaranteed bandwidth and quality of service. Accordingly, Equation [1] above may be modified so as to produce cell priority levels ranging between PL=1 and PL=7, such that $\lfloor x \rfloor$ represents the integer part of x, if 1<x<7.

It can be seen by application of Equation [1] above that if a connection is exploiting network capacity in excess to the connection's negotiated NBR value, the priority level of cell$_i$ is at least 4. It can further be seen that if the momentary bit rate at the UNI is less than the negotiated value of NBR, PL is at most 4. The priority level scheme in accordance with this embodiment of the present invention thus permits adjustment of the relative capacity used by a connection in steps of 2. From Equation [1] above, it can be seen that for an NBR of 100 kbit/s, an MBR higher than 566 kbit/sec results in a PL of 7, and an MBR lower than 8.8 kbit/s results in a PL of 0.

The three priority level bits allocated in the cell header are set 78 for each ATM cell transferred from the UNI. The ATM cells are then transmitted 80 to targeted network nodes$_j$ identified by node addressing information provided in the cell header.

It is noted that if a user is not satisfied with the quality of service of the connection, the user may elect between at least three alternatives. First, the user may elect to keep the average bit rate unchanging, but reduce the variation of traffic process. Second, the user may elect to decrease the average bit rate, or to increase the nominal bit rate. Increasing the NBR will, however, generally result in a concomitant increase in cost for a higher speed connection. Finally, the user may change the network operator.

In FIG. 4, there is illustrated in flow diagram form a general methodology by which a network node processes cells containing priority level information received from a UNI in accordance with one embodiment of the present invention. FIG. 5 illustrates an embodiment of various components of a network node employed to effectuate the methodology illustrated in FIG. 4. It is assumed that a cell, such as cell$_i$, has been processed at a UNI and includes priority level information derived in a manner described hereinabove.

Cell$_i$ is transmitted from the UNI to a network node and is received at a filter 88 of the node. A memory manager 89 checks the status 81 of the memory 90 in order to determine the occupancy in the memory 90. The memory manager 89 determines 82 the allowable priority level (PL$_a$) based on the occupancy state of the memory 90. In general, the memory manager 89 establishes a high allowable priority which translates to a low allowable priority "level," for example PL$_a$=0 or 2, when the occupancy level of the memory 90 is high (i.e., few available memory locations). When the memory manager 89 determines that the memory 90 has ample capacity for receiving new cells, the memory manager 89 establishes a low allowable priority which translates to a high allowable priority "level," for example PL$_a$=6 or 7. As will be appreciated by those skilled in the art, the calculation of PL$_a$ could alternatively be based on unoccupied buffer capacity rather than on buffer occupancy without departing from the spirit of the invention.

If the priority level of cell$_i$ is greater than the allowable priority level, PL$_a$, as determined 83 by the memory manager 89, the filter 88 discards 84 cell$_i$. If, on the other hand, the priority level of cell$_i$ is equal to or less than the allowable priority level PL$_a$, the filter 88 accepts 85 cell$_i$. The memory manager 89 coordinates the transfer 86 of cell$_i$ to the memory 90 and updates an index table 91 coupled to the memory manager 89 to include a new index table entry for newly accepted cell$_i$. In one embodiment, the index table 91 stores the location of the accepted cell$_i$ in the memory 90, and also stores a cell-type indicator which specifies whether cell$_i$ is a real-time cell or a non-real-time cell. As such, the memory 90 may store both real-time and non-real-time cells.

The memory manager 89, in cooperation with the index table 91, manages cell transfer operations from the memory 90 to the output of the memory 90 by giving preference to the real-time cells over the non-real-time cells. By way of example, the memory manager 89, upon determining the presence of both rt-cells and nrt-cells stored in the memory 90, transfers all of the rt-cells to the output of the memory 90 prior to transferring out any of the nrt-cells.

Figure 6:
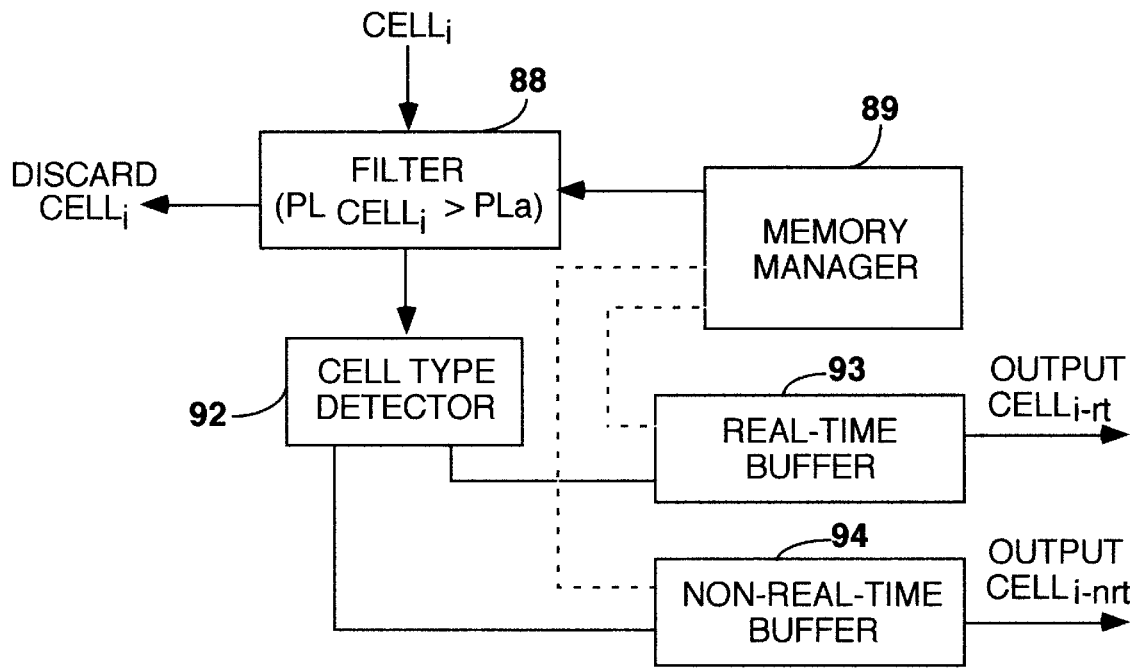
FIG. 6 is a block diagram of an alternative embodiment of a system for filtering cells at a network node in accordance with a nominal bit rate service.

In accordance with another embodiment, as is illustrated in FIG. 6, a memory manager 89 determines the status of a real-time buffer (rt-buffer) 93 and a non-real-time buffer (nrt-buffer) 94. The memory manager 89 determines, in a manner similar to that previously described, the allowable priority level, PL$_a$, for the filter 88 based on the status of the rt-buffer 93 and the nrt-buffer 94. If the priority level of cell$_i$ is greater than the allowable priority level, PL$_a$, the filter 88 discards cell$_i$. If, on the other hand, the priority level of cell$_i$ is equal to or less than the allowable priority level, PL$_a$, cell$_i$ is accepted.

In accordance with another embodiment, the network node may apply a buffer filtering scheme which performs the filtering function based on packets of cells, rather than on individual cells. By way of example, the filtering procedure described hereinabove may be applied to the first cell of each packet. If the first cell is discarded by the node, then all of the cells of the packet following the first cell are discarded as well. If, however, the first cell of a packet is accepted, then the priority of all other cells belonging to that packet may be increased, for example by changing the priority level from PL=5 to PL=3. A gain of even one priority level, such as from PL=4 to PL=3, is believed to be sufficient to ensure that there will only be very few partially transmitted packets.

A cell-type detector 92 receives the accepted cell, $cell_i$, from the filter 88 and determines whether $cell_i$ is an rt-cell or an nrt-cell. As discussed previously, the header of $cell_i$ includes a header bit, such as the CLP bit, which indicates whether or not $cell_i$ is an rt-cell or an nrt-cell. The cell-type detector 92, upon determining the service class type of the $cell_i$, transfers the $cell_i$ to either the rt-buffer 93 or the nrt-buffer 94. In a manner similar to that described previously with respect to FIGS. 4 and 5, the memory manager 89 coordinates the output of rt-cells and nrt-cells respectively from the rt-buffer 93 and the nrt-buffer 94, giving preference to the rt-cells.

In accordance with another embodiment of the present invention, it may be desirable, for purposes of enhancing network expansion and traffic control, to request that each user of the network purchase a maximum NBR. The maximum NBR value is intended to remain substantially constant. In addition, it may be desirable to request that each user select an appropriate instantaneous NBR, which should be no greater that the selected maximum NBR. The selection of an appropriate instantaneous NBR generally involves a compromise between price and quality of service. The service quality detected by a user depends largely on three parameters, namely the NBR, the average bit rate, and the amount of traffic variations. Although a user may change any of these parameters, the only information that the network needs to know at the initiation of cell transmission is the NBR and the service class (real-time or non-real-time) of the connection.

In accordance with another embodiment of the present invention, a SIMA service model provides for the accommodation of both NBR and traditional ATM service connections. It is appreciated that traditional ATM services which offer guaranteed connections may be desirable for certain applications. It is anticipated, however, that the quality of service offered by the NBR service of the present invention will meet or exceed a user's expectations for virtually all real-time and non-real-time applications.

A SIMA service which provides for both NBR and traditional ATM services requires that the network operator dedicate a UPC device for each conventional ATM connection, or possibly for each virtual path. All of the cells transmitted using traditional ATM service connections are designated with the highest priority of PL=0 and with a real-time (rt) service class designation. In accordance with this approach, the zero priority level is reserved for those connections that use an ordinary ATM service with guaranteed bandwidth and quality of service. Accordingly, the priority determination Equation [1] above is modified so as to produce cell priority levels ranging between PL=1 and PL=7, such that $\lfloor x \rfloor$ represents the integer part of x, if 1<x<7. It is noted that if the network operator wants to mark excessive cells as CLP=1 cells, those cells may be marked with a lower priority, such as PL=6, for example.

A point of possible incompatibility with traditional ATM technology involves the necessity of three bits for each ATM cell for the determination of cell priority, or two bits if the current cell loss priority, CLP, bit in the cell header is used. In addition, one bit is needed to distinguish between real-time and non-real-time connections. The rt/nrt service bit may be, but is not required to be, included in every cell. It may be possible to utilize the current Generic Flow Control (GFC) field which constitutes a total of four bits. In this case, three bits may be allocated for designating cell priority level and one bit may be designated as the rt/nrt service class bit.

Figure 7:
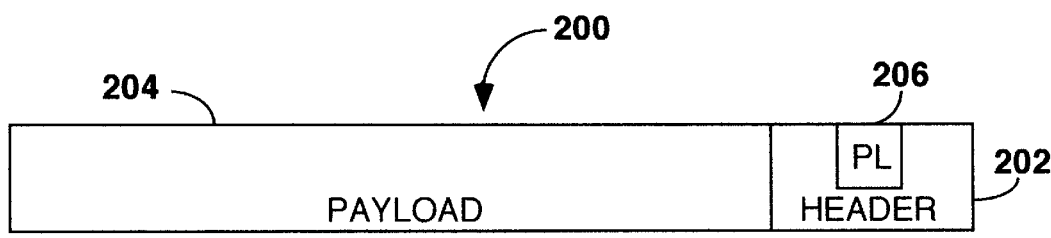
FIG. 7 illustrates one embodiment of a network cell in accordance with the present invention.

Referring now to FIG. 7, one embodiment of a network cell 200 in accordance with the present invention is shown. As previously described, ATM standards define an ATM cell as a fixed-size cell with a length of 53 octets comprised of a 5-octet header and a 48-octet payload. The cell 200 is modeled after the ATM standard cell, and includes a 5-octet header 202 and a 48-octet payload 204. Priority levels are calculated, and a priority level is assigned to each cell prior to being transmitted from a UNI to the network. Designation of the priority level attributed to a particular cell is stored in the priority level field (PL) 206. In the present example, eight priority levels are available, thereby necessitating the allocation of three bits in the PL field 206.

Figure 8:
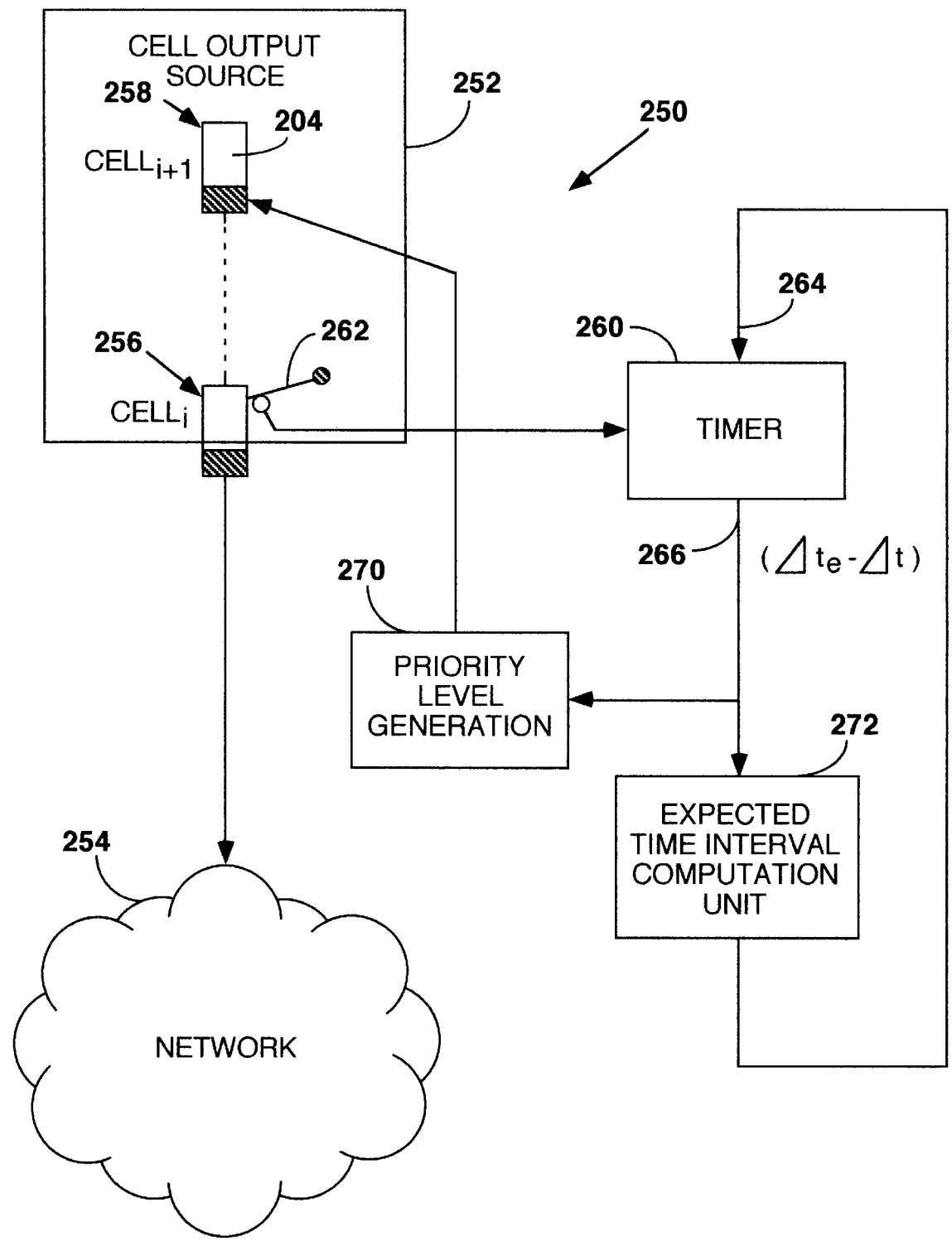
FIG. 8 is a block diagram illustrating a cell traffic measurement and priority assignment system in accordance with one embodiment of the invention.

FIG. 8 is a block diagram illustrating a cell traffic measurement and priority assignment system 250 in accordance with one embodiment of the present invention. The system 250 transmits cells and monitors the cell transmission rate on a particular connection, and assigns a priority level designation to each cell. The priority level assigned to a particular cell depends on the current cell transmission rate as compared to the established NBR. In one embodiment of the invention, eight priority levels exist, and a priority level value indicative of one of the eight priority levels is assigned to each of the cells transferred by a user from the UNI. Assuming eight priority levels, priority level values in one embodiment are assigned such that doubling the cell transfer rate causes the priority level (PL) to be incremented, where a PL of four corresponds to the negotiated nominal bit rate. This is illustrated in Table 1 below:

TABLE 1

| PL | 7 | 6 | 5 | 4 | 3 | 2 | 1 | 0 |
|---|---|---|---|---|---|---|---|---|
| Rate | 8*NBR | 4*NBR | 2*NBR | NBR | NBR/2 | NBR/4 | NBR/8 | NBR/16 |

Referring to FIG. 8, the cell output source 252 outputs information in streams of cells to one or more network nodes or destinations via the network 254. The sequential output of cells from the cell output source 252 is illustrated by the $cell_i$ 256 and the $cell_{i+1}$ 258. Each of the cells 256 and 258 include a payload portion 204 and a header portion 202.

When $cell_i$ 256 is output from the cell output source 252, a timer 260 is initiated, which is represented functionally by the switch function 262. The timer 260 in one embodiment of the invention is a count-down timer which is preset with a timer value from input 264. The timer 260 counts down from the predetermined value until is the next cell, shown as $cell_{i+1}$ is output from the cell output source 252. The timer 260 in this example is able to provide both positive and negative timer outputs at timer output 266.

Because the timer is preset with a predetermined value, the timer output represented on timer output 266 provides a difference between the predetermined value at input 264 and the elapsed time from the output of $cell_i$ to the output of $cell_{i+1}$. For example, where the input to the timer 260 was set to one thousand timing units, and the timer 260 decrements the output 266 one hundred times, the timing output 266 will output a value of nine hundred at the time that $cell_{i+1}$ 258 is output. Therefore, the timer 260 provides an output which corresponds to the time which has elapsed between two cell transmissions, as compared to a predetermined expected time interval. The timer 260 provides the function shown in equation 2 below:

$$(\Delta t_e - \Delta t) \quad [2]$$

where $\Delta t_e$ is the expected time interval input at input 264, and $\Delta t$ corresponds to the time that passed from the output of $cell_i$ 256 to the output of $cell_{i+1}$ 258.

The priority level generation unit 270 receives the resulting value from equation 2 for the timer output 266, and generates an integer value priority level in response thereto. This priority level (PL) is supplied to the priority level (PL) field 206 of the header 202 of subsequently issued cells such as $cell_{i+1}$ 258. The difference of $\Delta t_e - \Delta t$ indicates whether the priority level assigned to cells should be increased or decreased as a result of the increasing or decreasing calculated cell transmission rate, which can be determined through a comparison to the expected time interval $\Delta t_e$.

The expected time interval computation unit 272 computes the expected time interval $\Delta t_e$ which is input to the timer 260 at input 264. The expected time interval computation unit 272 receives the timer output from the timer output 266 which provides the difference between the expected time interval and the time between concurrent cell transmissions. The manner in which the computation unit 272 calculates the expected time interval is described in greater detail in the following description.

The expected time interval between transmitted cells is taken to be the time interval between the last two cells transmitted. If the cell output source 252 transmits cells at a constant rate c, then the inverse of that rate 1/c provides the time interval between a $cell_i$ and a previously emitted $cell_{i-1}$. This expected time interval can be written as shown in equation 3 below:

$$\Delta t_e = \frac{1}{c(PL_R)} = \frac{2^{4-PL_{R(i-F1)}}}{NBR} \quad [3]$$

where $PL_{R(i-1)}$ is the value of $PL_R$ at the moment $t_{(i-1)}$. The real value of the priority level is a continuous real number $PL_R$, as compared to the integer value priority level PL derived from $PL_R$ at the priority level generation unit 270.

However, where the cell output source 252 changes its cell transmission rate, the actual time interval $\Delta t$ between transmitted cells differs from the expected value $\Delta t_e$. This difference $\Delta t_e - \Delta t$ indicates whether the parameter $PL_R$ should be increased or decreased. Where the cell output source 252 begins to transmit at a higher rate, then the difference of $\Delta t_e - \Delta t$ is a positive value, as the $\Delta t$ decreases with respect to $\Delta t_e$. Where the transmission rate decreases, the difference becomes negative, as the $\Delta t$ becomes larger than the expected time interval $\Delta t_e$. The positive or negative result is sensed by the priority level generation unit 270, which allows it to alter the priority level assignment to subsequently transmitted cells.

Figure 9:
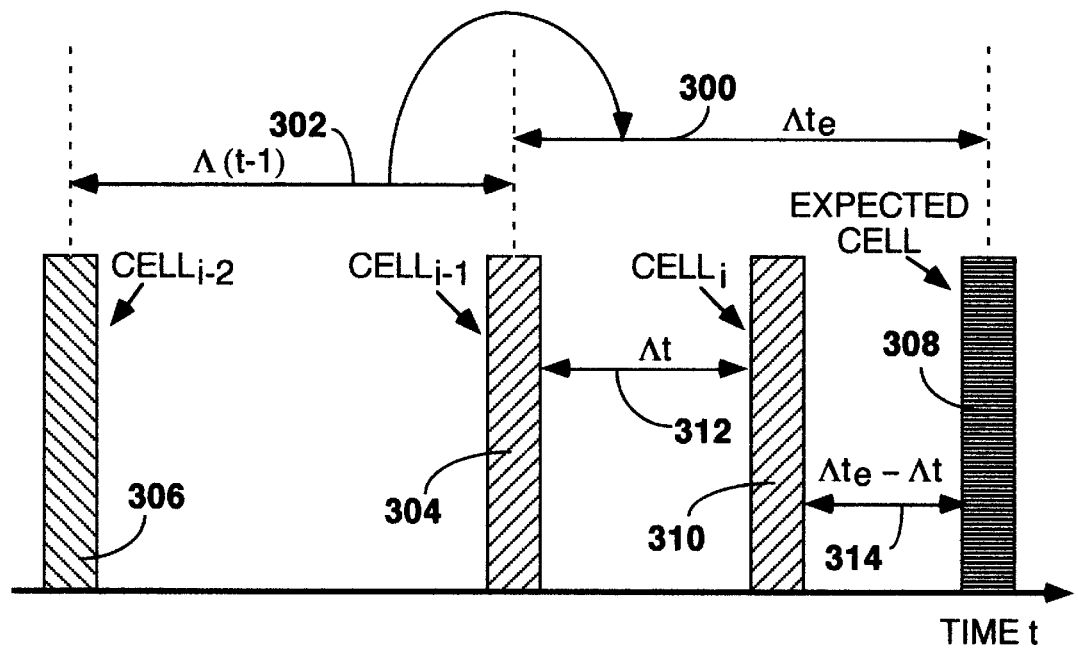
FIG. 9 graphically illustrates the calculation of the expected time interval, $\Delta t_e$, and the cell transfer interim, $\Delta t$.

Referring now to FIG. 9, the calculation of $\Delta t_e$ and $\Delta t$ is graphically illustrated. The expected time interval, $\Delta t_e$, represented on time dimension line 300, which corresponds to the time $\Delta(t-1)$ shown on time dimension line 302. The time $\Delta(t-1)$ corresponds to the time between the output of $cell_{i-1}$ 304 and $cell_{i-2}$ 306, which represents the most recently known cell time interval. In other words, the estimated time interval $\Delta t_e$ is set to correspond to the time interval between the previous two cells. Assuming a constant cell transmission rate, the next expected cell 308 would be scheduled to arrive at a time corresponding to $\Delta t_e$ from the occurrence of the $cell_{i-1}$ 304. $Cell_i$ 310 would therefore be expected at time $\Delta t_e$ as illustrated by the expected cell 308. However, where $cell_i$ 310 occurs prior to its expected time, the cell transmission rate has increased to some extent, resulting in $cell_i$ 310 occurring at a time $\Delta t$ shown on time dimension line 312 from the previous $cell_{i-1}$ 304. The difference in time is shown on time dimension line 314 as the $\Delta t_e$ 31 $\Delta t$ time interval. Because $\Delta t$ is less than $\Delta t_e$ in the example of FIG. 9, the resulting time difference is a positive number. Alternatively, where $\Delta t$ shown on time dimension line 312 is greater than $\Delta t_e$ shown on time dimension line 300, the resulting difference will be a negative number. The priority level generation unit 270 shown in FIG. 8 can detect the positive or negative characteristic of the difference of $\Delta t_e - \Delta t$, and can decrease or increase the priority level to be assigned to subsequent cells in response thereto.

Figure 10:
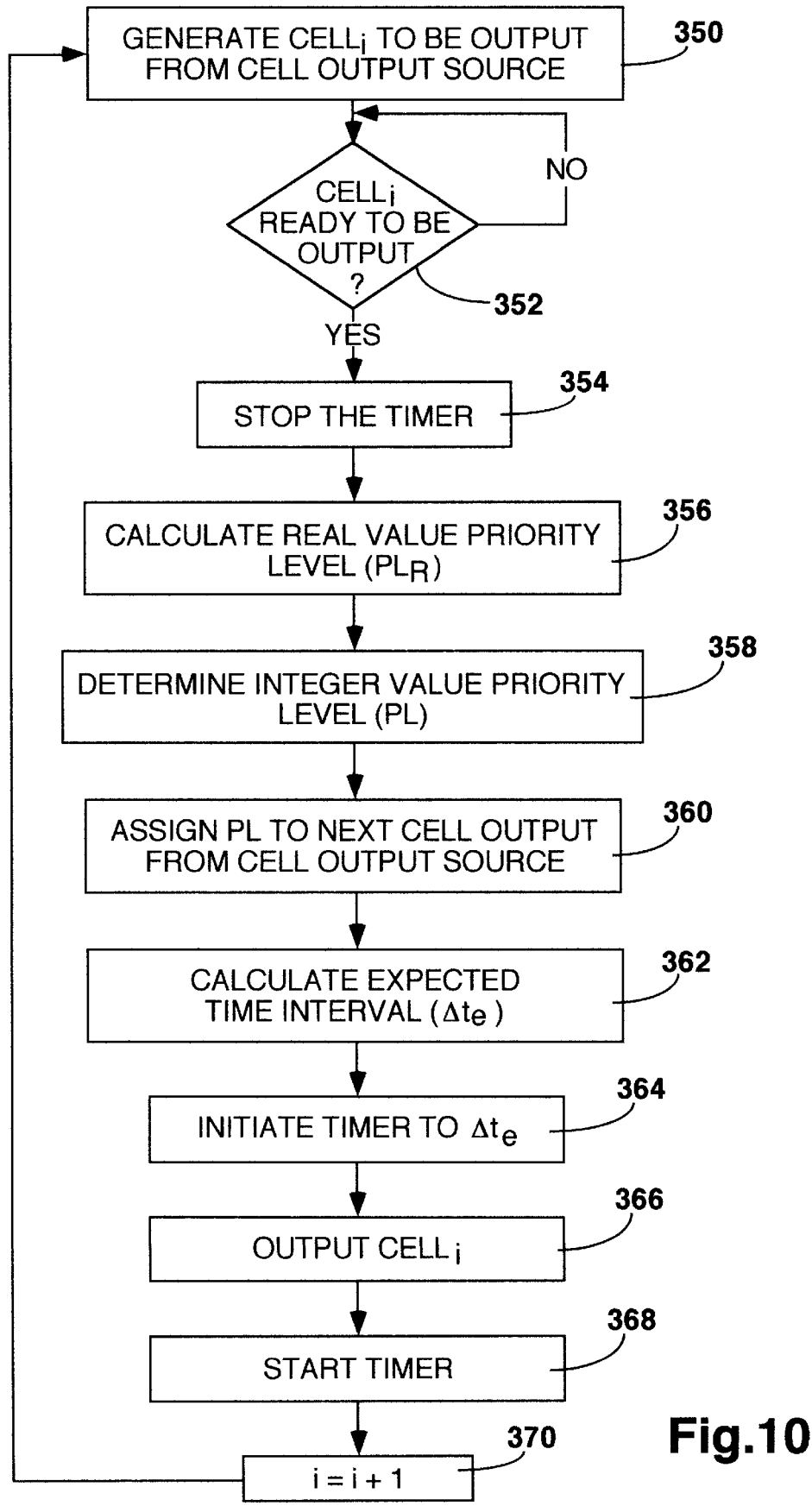
FIG. 10 is a flow diagram of one embodiment of the timer-based measurement and priority assignment system.

FIG. 10 is a flow diagram of one embodiment of the timer-based measurement and priority assignment system in accordance with the present invention. $Cell_i$ is generated 350 in order to be output from the cell output source 252. If $cell_i$ is ready to be output 352, the timer is halted 354. When the timer has been stopped, the priority level ($PL_R$) is calculated 356 as a real value.

The real priority level ($PL_R$) is calculated 356 at the priority level generation unit 270. Equations 4 and 5 below are executed by the priority level generation unit 270 in order to determine the real priority level. First, Table 1 above can be expressed as shown in Equation 4 below:

$$c_t(PL) = 2^{PL-4} NBR \quad [4]$$

where $c_t(PL)$ is the threshold transmission rate. This equation is valid only at eight integer PL values, namely PL=0, 1, 2, 3, 4, 5, 6 and 7. A continuous, or real number, priority level can be determined from the transmission rate of the source using Equation 5 below:

$$PL_R = \log_2(c/NBR) + 4 \quad [5]$$

Parameter $PL_R$ is therefore equal to PL where the rate c is one of those given in Table 1. The integer priority PL assigned to cells is therefore the integer portion of the continuous $PL_R$ parameter. For example, a cell source transmitting at a rate c=1.5 NBR has a real priority level $PL_R$=4.6, which results in the cells being assigned an integer priority level PL=4.

The priority level generation unit 270, having determined the $PL_R$ value, may also include a scaling factor to control the rate at which the system reacts to changes. The priority level generation unit 270 receives the timer output $\Delta t_e - \Delta t$, which is the difference between the actual and the expected time interval. This difference can then be scaled by a parameter $\beta$, which is then added to $PL_{R(i-1)}$ which was used in the calculation of the expected time interval $\Delta t_e$. Therefore, at time $t_i$, the scaled real priority level value is calculated as shown in Equation 6 below:

$$PL_{R(i)} = \beta(\Delta t_e - \Delta t) + PL_{R(i-1)} \quad [6]$$

The role of the parameter $\beta$ is to define how fast the system reacts to changes. A low $\beta$ causes the system to be less susceptible to priority level value changes. For example, a low $\beta$ causes the addend $\beta(\Delta t_e - \Delta t)$ to have less effect on the sum of $PL_{R(i)}$.

As can be seen from Equation 6 above, a negative resulting difference for $(\Delta t_e - \Delta t)$, which indicates that a successive cell time interval was of longer duration than the expected time interval, causes the $PL_{R(i)}$ value to decrease. Generally, this indicates that the cell transfer rate is, at least for the instant, decreasing. This allows the priority value to be decreased depending on the extent of the difference $(\Delta t_e - \Delta t)$ and the smoothing $\beta$ factor. A decreasing priority "value" indicates that the cells have a greater likelihood of being accepted, rather than discarded, at the nodes of the network. Analogously, where $(\Delta t_e-\Delta t)$ results in a positive $PL_R$, the successive cell time interval was shorter than the expected time interval, which causes the $PL_{R(i)}$ value to increase, thereby assigning priority values to cells which have a greater likelihood of being discarded at the network nodes. In the nominal bit rate service of the present invention, once an NBR has been established, the chance of cell discarding at the network nodes can be reduced by reducing the cell transfer rate. Alternatively, where the cell transfer rate is increased above the established NBR, the user faces a greater risk that cells may be discarded at the nodes.

The parameter $PL_R$ is periodically updated using Equation 6 above, and the integer priority level PL is determined 358 at the priority level generation unit 270 using the following equation:

$$PL=Int(PL_R) \qquad [7]$$

PL is the truncated, or integer, portion of $PL_R$. The integer priority level PL therefore changes when the change is great enough to overcome the difference $(\Delta t_e-\Delta t)$ and the smoothing $\beta$ factor of Equation 6. The integer PL is assigned 360 to the next cell output from the cell output source 252. This priority level is stored into the PL field 206 of the header 202 to be used at network nodes to manage node congestion and resulting cell discarding.

In order to reset the timer 260, the expected time interval computation unit 272 calculates 362 the expected time interval $\Delta t_e$. This calculation was described in Equation 3 above. The timer 260 is then initially loaded 364 with the calculated expected time interval $\Delta t_e$. $Cell_i$ is then output 366 from the cell output source 252 to the network 254, and the timer 260 is again started 368. The next $cell_i$ 370 is generated 350, and the next priority value is calculated for assignment to subsequent cells.

Figure 11:
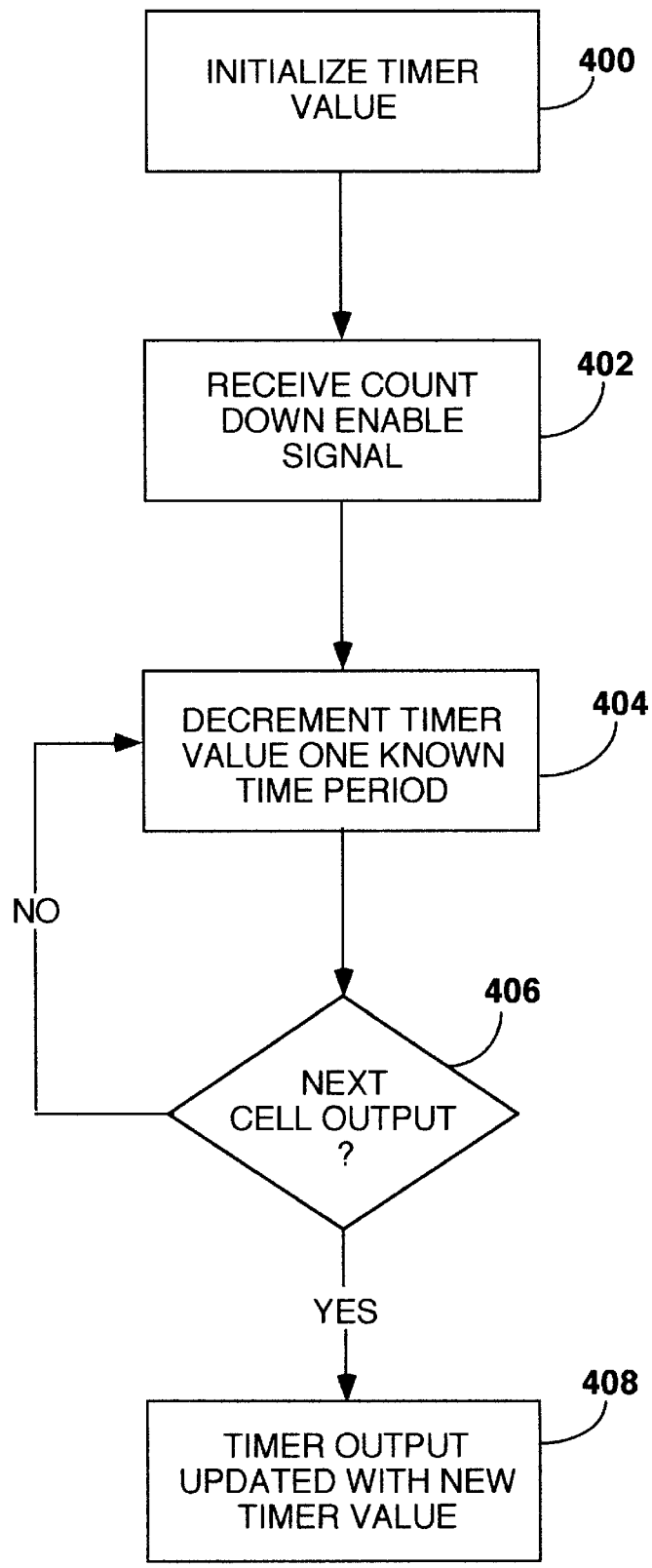
FIG. 11 is a flow diagram illustrating one embodiment of the timer in accordance with the present invention.

FIG. 11 is a flow diagram illustrating one embodiment of the timer 260 in accordance with the present invention. Generally, the timer 260 is initialized 400 with a predetermined timer value. When the count down enable signal is received 402, the timer value begins to decrement 404 at predetermined time periods. Where the next cell is output 406 from the cell output source 252, the timer output 266 is updated 408 with the new timer value. The new timer value corresponds to the initialized timer value which has been decremented to the new timer value. Where a subsequent cell has not been output 406, the timer 260 continues to decrement the timer value at the known time period until a subsequent cell is output 406. For example, the timer value may be decremented once every 100 microseconds until the next cell is output 406. The timer operation illustrated in FIG. 11 can be implemented using computer software, or alternatively using hardware circuitry such as described in connection with the example of FIG. 12 below.

Figure 12:
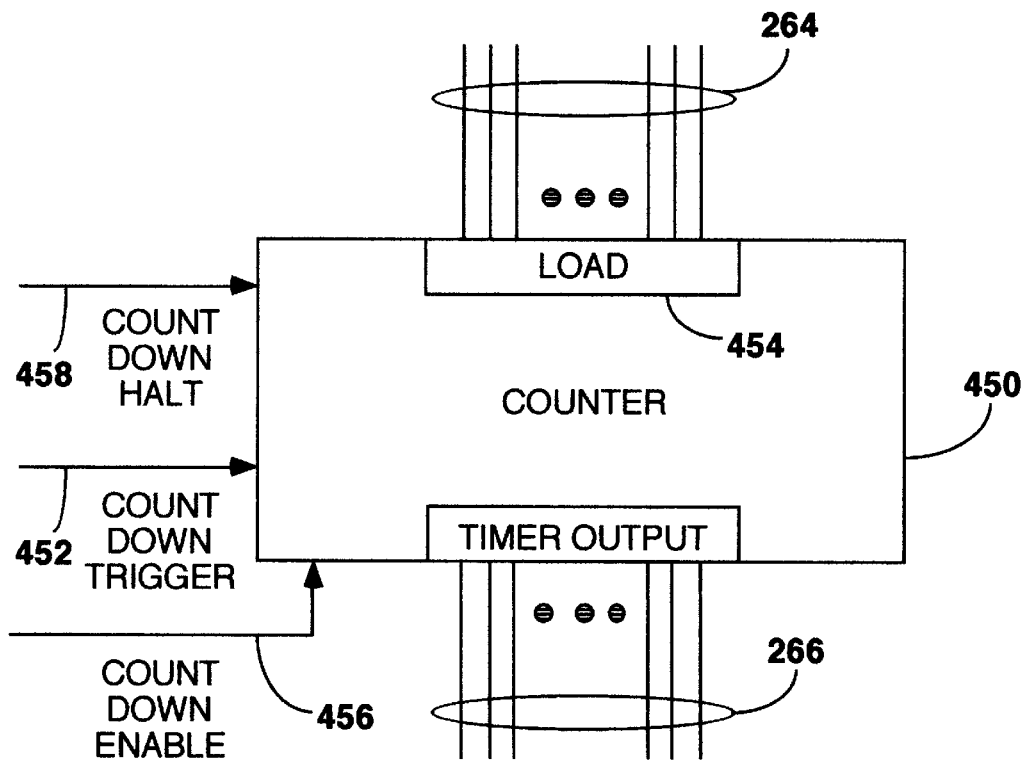
FIG. 12 is a diagram illustrating another embodiment of the timer in accordance with the present invention.

FIG. 12 is a diagram illustrating another embodiment of the timer 260 in accordance with the present invention. The timer 260 in this example is a counter 450 which can be loaded with a predetermined value, and can be decremented in accordance with an input signal such as the count down trigger signal on line 452. The counter 450 is implemented as a synchronous n-bit binary counter with load inputs 454 to receive the predetermined expected time interval value via the input signals 264. After the predetermined value has been loaded at the load inputs 454, a count down enable signal on line 456 initiates and enables the countdown in accordance with the occurrence of the count down trigger 452. Each time the count down trigger is activated, an updated timer output value is provided at the timer output on lines 266. The counter decrements from the predetermined value until it receives a count down halt signal on line 458, which occurs when the next cell (i.e., $cell_{i+1}$) is transmitted from the cell output source 252. Therefore, the count down halt signal on line 458 allows the counter 450 to hold the last counter value at the timer output, which corresponds to the time $\Delta t_e-\Delta t$.

For purposes of illustration, and not of limitation, examples are provided below to illustrate the relationship between the quality of service of an NBR or SIMA connection and throughput at different priority levels. The following examples demonstrate, in accordance with one embodiment of the present invention, the relative differences in QoS with respect to adjacent priorities, such as the QoS associated with PL=4 in comparison to that of PL=3. It is noted that a higher cost or fee is typically assessed to users who request a higher priority for cells transmitted from the user's user/network interface. By way of example, the user fee may be doubled if the user wants to obtain one degree of higher priority for every cell without changing the actual bit rate. The resulting QoS of the connection, therefore, should be improved such that at least some users are willing to pay the additional charge.

EXAMPLE #1

In accordance with this illustrative example, the following assumptions and consideration are given. It is assumed that there are many identical traffic sources which generate traffic independent of the current or previous load conditions in the network. The following traffic parameters are assumed: the link capacity is C=1, which is useful in the examples as a means of normalization; the peak bit rate $MBR_{MAX}=0.1$, which represents 10 percent of the link capacity, C; the ON probability at the burst (or packet) scale=0.2; and the average burst duration=1,000 time slots (i.e., the average packet size=100 cells). In addition, it is assumed that there is an upper ON/OFF layer, and that both the average ON-period and OFF-period of this layer are 100,000 time slots. The real time buffer 93 contains 200 cell locations and the non-real-time buffer 94 contains 5,000 cell locations. It is noted that the upper ON/OFF layer attempts to model the traffic process of connections, in which the determination of the number of connections is understood in the art to constitute a stochastic, random process. For example, if it is assumed that the total number of customers is represented by the variable x, then the average number of connections is x/2. More particularly, the number of connections is understood to be binomially distributed. As such, 100,000 time slots represent the average holding time of a connection, and, also, the average idle period realizable by the user. As a consequence, a user is transmitting cells only if a connection is active both at the connection layer and the packet layer. A time scale parameter, $\alpha$, can be obtained for the real-time and non-real-time connections:

$\alpha_{rt}=0.025$ $\alpha_{nrt}=0.001$

In this example, eight different connection types are assumed: four connections are real-time connections and four are non-real-time connections. Also, four different NBR values, which have been normalized with respect the link capacity of C=1, are assumed as: 0.2, 0.1, 0.05 and 0.025. The priorities corresponding to these NBR values, with $MBR_{MAX}=0.1$, are 3, 4, 5 and 6, respectively. It should be noted, however, that not all cells are assigned these exact priorities, and that especially with non-real-time connections, many cells obtain better priority values because of the affects of the averaging measuring principle. The distribution of cells having different priority levels, represented as percentages, is presented below in Table 2:

TABLE 2

| PRIORITY LEVEL | REAL (SIMULATED) PERCENTAGE OF OFFERED CELLS | PERCENTAGE BASED ON PEAK RATES |
|---|---|---|
| 1 | 6.1 | 0 |
| 2 | 7.9 | 0 |
| 3 | 24.3 | 25 |
| 4 | 23.5 | 25 |
| 5 | 21.5 | 25 |
| 6 | 16.8 | 25 |

Figure 13:
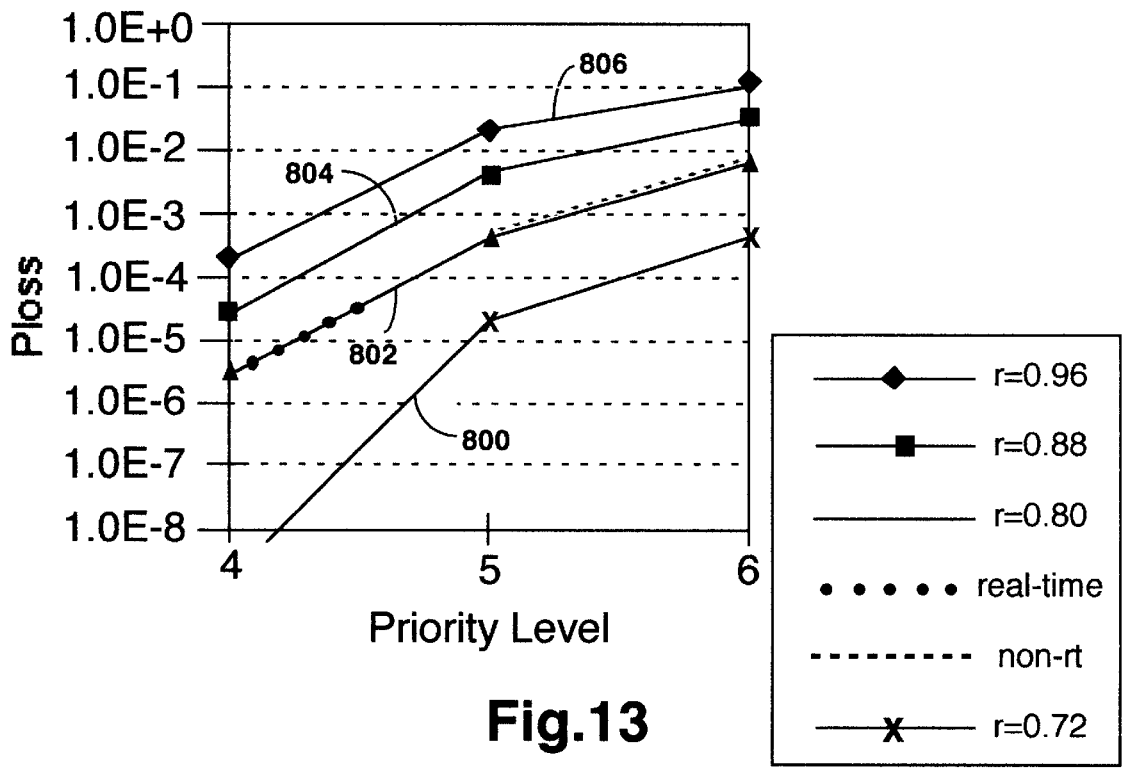
FIGS. 13–14 are graphical depictions of the relationship of average cell loss ratio, $P_{loss}$, as a function of priority level for four specific load levels.

In FIG. 13, there is shown a graph illustrating the relationship of average cell loss ratio, $P_{loss}$, as a function of priority level for four specific load levels, r. In particular, line-800 represents an overall average load level of 0.72 for 9 connections of each connection type (i.e., real-time and non-real-time connection types). Line-802 depicts an average load level of 0.80 for 10 connections of each connection type. Further, line-804 represents an average load level of 0.88 for 11 connections of each connection type, and line-806 represents an average load level of 0.96 for 12 connections of each connection type. It is noted that, in the case of line-802 indicating a load level of 0.80, the cell loss ratios, $P_{loss}$, for real-time and non-real-time cells are indicated by dotted and broken lines, respectively.

Given, for example, a traffic scenario where the operator wants to offer a cell loss ratio of $10^{-6}$ to cells with priority 4, the total load can be approximately 0.75. It can be assumed that this average cell loss ratio is sufficient for most video applications. Give the same traffic load conditions, priority level 5, which corresponds to $P_{loss} \approx 10^{-4}$, can meet the requirements of many voice applications, while priority 6, which corresponds to $P_{loss} \approx 3.10^{-3}$, is suitable for a TCP/IP type of file transfer, provided that there is an adequate packet discarding scheme in place.

It should be emphasized, however, that the difference in cell loss ratio between adjacent priorities depends strongly on the offered traffic process and, in particular, the inherent control loops of the NBR or SIMA service. When the user perceives an unsatisfactory QoS, for example, the user can, and should, change either the actual bit rate or the nominal bit rate of the connection. In either case, the priority distribution changes as well. Nevertheless, if this phenomenon is temporarily ignored, the basic behavior of priority distribution may be further appreciated by making the following simplifying assumption: If it is assumed that all traffic variations are slow as compared to the measuring period and buffer size, then a well-known, conventional ATM approach to approximating cell loss ratio may be used, with the additional requirement that the eight NBR priority levels are taken into account.

If the loss ratio of cells with priority k is denoted by $P_{loss,k}$, and the average loss ratio of cells with a priority of 0 to k is denoted by $P^*_{loss,k}$, then the following equation, which ignores buffering effect, provides that:

$$P^*_{loss,k} = \frac{\sum_{j:\lambda_j > c} \Pr\{\lambda^*_k = \lambda_j\}(\lambda_j - c)}{\rho^*_k c} \quad [8]$$

-continued $$P_{loss,0} = P^*_{loss,0}$$

$$P_{loss,0} = \frac{\rho^*_k P_{loss,k} - \rho^*_{k-1} P^*_{loss,k-1}}{\rho^*_k - \rho^*_{k-1}} \text{ for } k = 1\ldots7$$

where, $\lambda^*_k$ represents the momentary bit rate level of all cells with a priority of 0 to k, $\rho^*_k$ represents the average offered load produced by these cells, and c represents the link capacity. The probability $\Pr\{\lambda^*_k = \lambda_j\}$ can be calculated in a straightforward manner using known convolution techniques.

EXAMPLE #2

For purposes of further illustration, a second example is provided which assumes the same sources described in Example #1, except for the long ON and OFF periods. Because of the long periods reflected in Example #1, the peak rate always determines the cell priority. As the buffers are typically not capable of filtering any traffic variations, the allowed load in Example #2 is much lower than that in the original case of Example #1.

Figure 14:
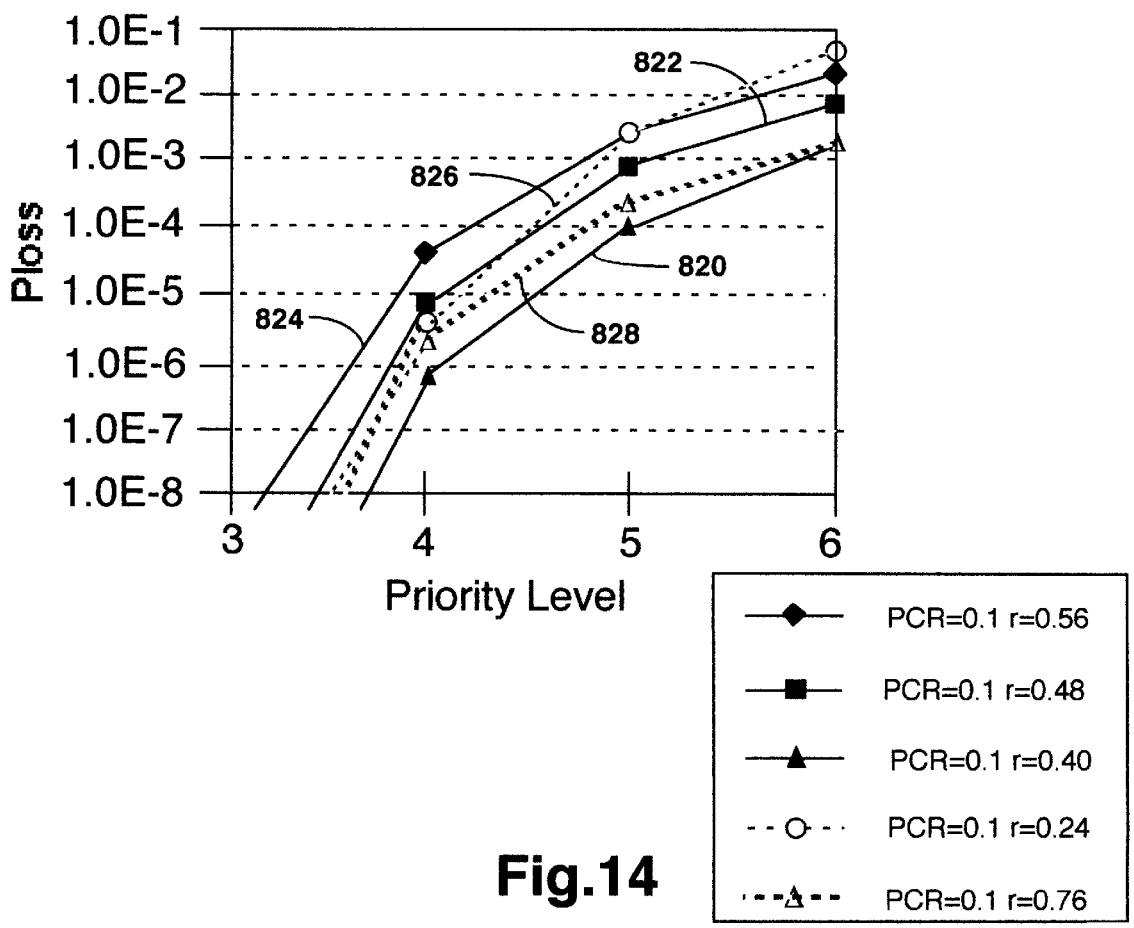

In FIG. 14, there is illustrated in graphical form a relationship between cell loss ratio as a function of priority level for different load levels, r. It is assumed in FIG. 14 that the peak cell rate of each connections depicted by solid lines 820, 822, 824 is 0.1, the peak cell rate of each connection depicted by the broken line-826 is 0.2, and the peak cell rate of each connection depicted by the dotted line-828 is 0.05.

FIG. 14 shows the cell loss probabilities obtained by application of Equation [8] for different priorities, depicted by the three solid lines, line-820, line-822, and line-824. In addition, two slightly different traffic cases are represented by the dotted line-828 and the broken line-826. The effects of changing the traffic variations are reflected in the graph provided in FIG. 14. The actual change in traffic variations is a direct consequence of doubling or halving bit rates and NBR values.

In a network that embraces the NBR/SIMA service concept, an increase of traffic variations has two main effects if the operator keeps the QoS of priority level 4 unchanged. First, the allowed load level is decreased in the same way as in conventional ATM, and second, the difference in cell loss ratio between adjacent priority level decreases. For purposes of providing a rough estimate of QoS based on FIGS. 13 and 14, it may be assumed that if priority level 4 offers a cell loss probability of $10^{-6}$, then the cell loss probability will be approximately $10^{-4}$ to $10^{-3}$ with priority level 5 depending on the overall traffic variations. The cell loss ratio with priority level 3 may be assumed to be less than $10^{-9}$, unless the traffic variations are very pronounced.

Although the above examples provide illustrations of relationships between QoS and priority levels, it may be unfruitful to attempt to exactly determine the allowed load or the cell loss difference between adjacent priority levels until user reactions to different QoS and usage charges are evaluated. In an NBR/SIMA service environment, a schedule of charges based on different QoS levels may be determined, in a certain sense, automatically. For example, if the difference in cell loss ratio between priority levels 4 and 5 is very small, it can be assumed that some of the connections will tend to move from priority level 4 to level 5 because of a lower assessed charge. This change indicates, apparently, that the cell loss ratio of priority level 4 decreases and the cell loss ratio of priority level 5 increases. It can be reasonably assumed that this type of movement continues until the QoS difference corresponds to the average user's expectation of a reasonable charging structure.

Similar concerns are raised with regard to the differences in charging which occur automatically during busy hours in contrast to idle hours. For example, it would appear reasonable to charge higher prices during periods of high load for a certain QoS, and charge lower prices during low load periods. However, it is believed desirable to avoid instigating a charging policy that assesses different fees for a certain NBR during busy and idle periods, which also avoids increasing the complexity of the charging scheme. The naturally occurring "supply and demand" effect may tend to automatically even out the load between busy and idle hours. It is anticipated that, if a user is displeased with the observable difference in QoS during busy and idle periods, the user may be motivated to pay a different rate during such periods.

It will, of course, be understood that various modifications and additions can be made to the preferred embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A method of controlling transmission of cells from a source unit to a destination unit over a network connection which includes one or more network nodes, the method comprising:

determining a duration of time between two successive cell transmissions to the network connection;

computing a time difference between the duration of time and a subsequent cell transmission; and computing a probability of subsequent cell acceptance at a network node in response to the computed time difference.

2. The method of claim 1, wherein computing the probability of subsequent cell acceptance at the network node further comprises either one of increasing or decreasing the probability of subsequent cell acceptance at the network node in response to the computed time difference.

3. The method of claim 1, wherein computing the probability of subsequent cell acceptance at the network node further comprises assigning a priority level to the subsequent cell in response to the computed time difference, the priority level indicating the probability of subsequent cell acceptance at the network node.

4. The method of claim 3, wherein assigning the priority level to the subsequent cell further comprises altering the priority level so as to increase the probability of subsequent cell acceptance at the network node in response to an increase in the computed time difference.

5. The method of claim 3, wherein assigning the priority level to the subsequent cell further comprises altering the priority level so as to decrease the probability of subsequent cell acceptance at the network node in response to a decrease in the computed time difference.

6. The method of claim 1, wherein the time difference is computed to be either a negative time value or a positive time value, and computing the probability of subsequent cell acceptance at the network node further comprises:

increasing the probability of subsequent cell acceptance at the network node in response to the negative time value; and decreasing the probability of subsequent cell acceptance at the network node in response to the positive time value.

7. The method of claim 1, wherein determining the duration of time further comprises determining the duration of time between the two successive cell transmissions using a timer which is decremented at predetermined time periods upon a first cell transmission of the two successive cell transmissions and halted upon a second cell transmission of the two successive cell transmissions.

8. The method of claim 1, wherein the network connection constitutes a nominal bit rate connection.

9. A method of controlling cell transmissions from a network source unit to one or more network destination units across a network connection including one or more network nodes, the method comprising:

determining an expected time interval defined as a duration of time between a first cell transmission and a second cell transmission to the network connection, respectively;

transmitting a third cell to the network connection subsequent to the first and second cell transmissions;

determining an actual time interval between transmission of the second and third cells to the network connection, respectively;

computing a time difference between the expected and actual time intervals; and determining a priority level of the third cell in response to the computed time difference, the priority level indicating a probability of third cell acceptance at a network node.

10. The method of claim 9, wherein determining the priority level of the third cell further comprises adjusting the priority level of the third cell so as to increase the probability of third cell acceptance at the network node in response to the actual time interval being longer in duration relative to the expected time interval.

11. The method of claim 9, wherein calculating the priority level of the third cell further comprises adjusting the priority level of the third cell so as to decrease the probability of third cell acceptance at the network node in response to the actual time interval being shorter in duration relative to the expected time interval.

12. The method of claim 9, wherein determining the actual time interval between the first and second cell transmissions further comprises using a timer which is decremented at predetermined time periods upon the first cell transmission and halted upon the second cell transmission.

13. The method of claim 9, wherein determining the priority level of the third cell further comprises altering the priority level of the third cell so as to increase the probability of third cell acceptance at the network node in response to an increase in the computed time difference.

14. The method of claim 9, wherein determining the priority level of the third cell further comprises altering the priority level of the third cell so as to decrease the probability of third cell acceptance at the network node in response to a decrease in the computed time difference.

15. The method of claim 9, wherein the time difference is computed to be either a negative time value or a positive time value, and determining the probability of third cell acceptance at the network node further comprises:

increasing the probability of third cell acceptance at the network node in response to the negative time value; and decreasing the probability of third cell acceptance at the network node in response to the positive time value.

16. The method of claim 9, wherein the network connection constitutes a nominal bit rate connection.

17. A system for controlling transmission of cells to a network connection including a plurality of network nodes defined along the network connection, the system comprising:
- a source unit that transmits the cells to the network connection;
- a timer unit that determines an expected time interval defined as a duration of time between two successive cell transmissions to the network connection, and determines an actual time interval defined as a duration of time between transmission of a latter of the two successive cell transmissions and a transmission of a subsequent cell to the network connection; and
- a processor that computes a priority level of the subsequent cell in response to a time difference between the expected and actual time intervals, the priority level of the subsequent cell indicating a probability of subsequent cell acceptance at a network node.

18. The system of claim 17, wherein the processor computes the priority level by adjusting the priority level of the subsequent cell so as to increase the probability of subsequent cell acceptance at the network node in response to an increase in the time difference.

19. The method of claim 17, wherein the processor computes the priority level by adjusting the priority level of the subsequent cell so as to decrease the probability of subsequent cell acceptance at the network node in response to a decrease in the time difference.

20. The system of claim 17, further comprising a measuring unit that determines an actual bit rate of the cells transmitted to the network connection, wherein the processor computes the priority level of the subsequent cell using a ratio of a nominal bit rate established for the connection and the actual bit rate of the connection.

* * * * *